(12) United States Patent
Mishra

(10) Patent No.: US 9,465,994 B1
(45) Date of Patent: Oct. 11, 2016

(54) PREDICTING PERFORMANCE AND SUCCESS OF LARGE-SCALE VISION ALGORITHMS

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 14/629,196

(22) Filed: Feb. 23, 2015

(51) Int. Cl.
*G06K 9/00* (2006.01)
*H04N 5/77* (2006.01)
*H04N 7/18* (2006.01)
*H04N 1/00* (2006.01)
*G06K 9/52* (2006.01)
*H04N 101/00* (2006.01)

(52) U.S. Cl.
CPC ....... *G06K 9/00718* (2013.01); *G06K 9/00771* (2013.01); *G06K 9/522* (2013.01); *H04N 1/00204* (2013.01); *H04N 5/77* (2013.01); *H04N 7/18* (2013.01); *G06T 2207/20056* (2013.01); *G06T 2207/30232* (2013.01); *H04N 2101/00* (2013.01)

(58) Field of Classification Search
CPC ................ G06K 9/00718; G06K 9/00771; G06K 9/522; H04N 1/00204; H04N 5/77; H04N 7/18
See application file for complete search history.

(56) References Cited

U.S. PATENT DOCUMENTS

| | | | |
|---|---|---|---|
| 2007/0093993 A1* | 4/2007 | Stork | H04N 5/225 703/2 |
| 2008/0284896 A1* | 11/2008 | Robinson | H04N 17/002 348/335 |
| 2012/0281078 A1* | 11/2012 | Kobayashi | A61B 1/00016 348/65 |
| 2014/0204420 A1* | 7/2014 | Sekiguchi | G06F 9/5072 358/1.15 |

* cited by examiner

*Primary Examiner* — Nicholas Giles
(74) *Attorney, Agent, or Firm* — Athorus, PLLC

(57) ABSTRACT

Where a plurality of machine learning algorithms is available to process information or data in the furtherance of a task, one of the algorithms may be identified as particularly well-suited or appropriate based on attributes of the information or data. Such attributes of the imaging data may be determined by any means, and a prediction as to the performance (e.g., one or more metrics) or success of each of the algorithms may be made. One of the algorithms may ultimately be selected based on such predictions, as well as the computing resources that are available for executing the algorithms, and any other relevant constraints.

21 Claims, 7 Drawing Sheets

PREDICTING PERFORMANCE AND SUCCESS OF LARGE-SCALE VISION ALGORITHMS

BACKGROUND

Imaging devices such as video cameras may capture and record still or moving images in digital computer-based files that may be stored in one or more hard drives, servers or other non-transitory computer-readable media. For example, video cameras are frequently provided in financial settings such as banks or casinos, where money changes hands in large amounts or at high rates of speed, or within warehouses, fulfillment centers or other like facilities, where consumer goods commonly arrive or depart in containers of various sizes or shapes, as well as in locations such as airports, stadiums or other dense environments, where the travels of persons or objects, or the flow of traffic on one or more sidewalks, roadways or highways may be observed.

While files which include such imaging data may be individually captured and stored with relative ease, where a large number of cameras are provided in order to monitor various aspects of a particular space, location or facility, the amount of digital storage capacity and computer processing power that is required in order to centrally analyze, index and store such files for any relevant purpose may be overwhelming. Where a facility such as a warehouse or an airport provides a large array of digital cameras for surveillance or monitoring operations, such cameras may capture and store over a petabyte (or a million gigabytes) of video data from such cameras each day.

For example, many high-level computer vision algorithms, including but not limited to machine learning algorithms provided for reading bar codes, recognizing characters or detecting activities, or image processing algorithms for transforming, combining, measuring or converting images, may consume substantial amounts of computer resources in order to properly evaluate imaging data for their intended purposes. Such vision algorithms, or vision systems employing such algorithms, often require large numbers of files and extensive amounts of visual data, e.g., streams of videos or images, to be transferred to one or more sites or resources for temporary storage or until the evaluation of the imaging data is complete. Singularly or collectively, such factors may complicate the execution of computer vision and/or machine learning algorithms, and render such algorithms expensive to operate in terms of the network bandwidth, storage capacity or processing power that each algorithm may require.

The performance and success of individual computer vision and machine learning algorithms, especially such algorithms that may be operated in large-scale systems with many individual imaging devices having independent fields of view, may vary considerably due to the limited size and variability of the data sets that are used to train such algorithms, as well as a lack of dimensionality within the algorithms, and the nature and quality of the incoming imaging data to be processed. Presently, the processing of imaging data according to such complex algorithms often fails, frequently or abruptly, and in inexplicable or unpredictable ways. The reliability of such computer vision or machine learning algorithms, and the computer systems on which such algorithms operate, pose a serious problem in large-scale applications in which imaging data is processed in multiple stages. Accordingly, a failure of one or more intermediate steps of an algorithm, or of a computer system during the performance of such steps, may subvert an entire process, thereby rendering the use and consumption of computer resources (e.g., resources consumed in order to transfer, store or process imaging data) prior to such failure useless.

For example, algorithms that are configured to recognize events or activities within surveillance footage may commonly fail at later stages, in which a lack of contrasting or distinct visual features within the footage may negatively affect the reliable classification of events or activities performed by or associated with one or more people or objects recognized therein. By a time when one or more of such algorithms is identified as having failed, however, a substantial amount of computer resources may have already been expended in transferring, temporarily or permanently storing, or subsequently processing the footage to detect one or more aspects of motion or to recognize one or more humans or objects therein.

When conducting surveillance or monitoring operations, video cameras may be aligned and configured to capture imaging data including still or moving images of objects, actions or events within their respective fields of view, and information regarding the captured imaging data or the observed objects, actions or events may be recorded and subjected to further analysis in order to identify aspects, elements or features of the content expressed therein. Such video cameras may be provided alone or in groups, and programmed to recognize when an action or event has occurred, such as when a frame-to-frame analysis of video imagery suggests that a predetermined threshold has been exceeded or that a predetermined condition has been satisfied, or otherwise implies that the action or the event has occurred based on information or data captured by the video cameras. Moreover, information and data captured by such video cameras may be archived in one or more data stores, where the information or data may be further analyzed at a later time, or used or recalled for any purpose.

DETAILED DESCRIPTION

As is set forth in greater detail below, the present disclosure is directed to the prediction of the quality of performance and level of success of one or more vision algorithms with regard to imaging data obtained in large-scale vision applications, e.g., applications for processing imaging data obtained by large numbers of imaging devices provided in a network for one or more dedicated purposes. More specifically, the systems and methods disclosed herein may be configured to determine one or more characteristics or attributes of imaging data obtained from such imaging devices, and select one of a plurality of algorithms or computer-based methods for performing a predetermined function based on the attributes of the imaging data, which may be indicative of the scene or surroundings expressed in the imaging data, and may be quantitative (e.g., numerical data representative of colors, contrasts, intensities or other aspects of one or more pixels) or qualitative (e.g., labels or tags such as "outdoor" or "cloudy") in nature. The algorithm may be selected on any basis with regard to the attributes of the imaging data, and according to any criteria, including but not limited to the available processing power, memory or storage on one or more computing devices, or processing times that may be required in order to execute the algorithm on the imaging data, or the likelihood that executing the algorithm on the imaging data will successfully achieve a desired result. Thus, the systems and methods of the present disclosure may be used to preferentially identify one or more algorithms for processing imaging data based on the predicted performance and success of such algorithms, as derived by quantitative or qualitative descriptions of the imaging data to be processed.

Figure 1:
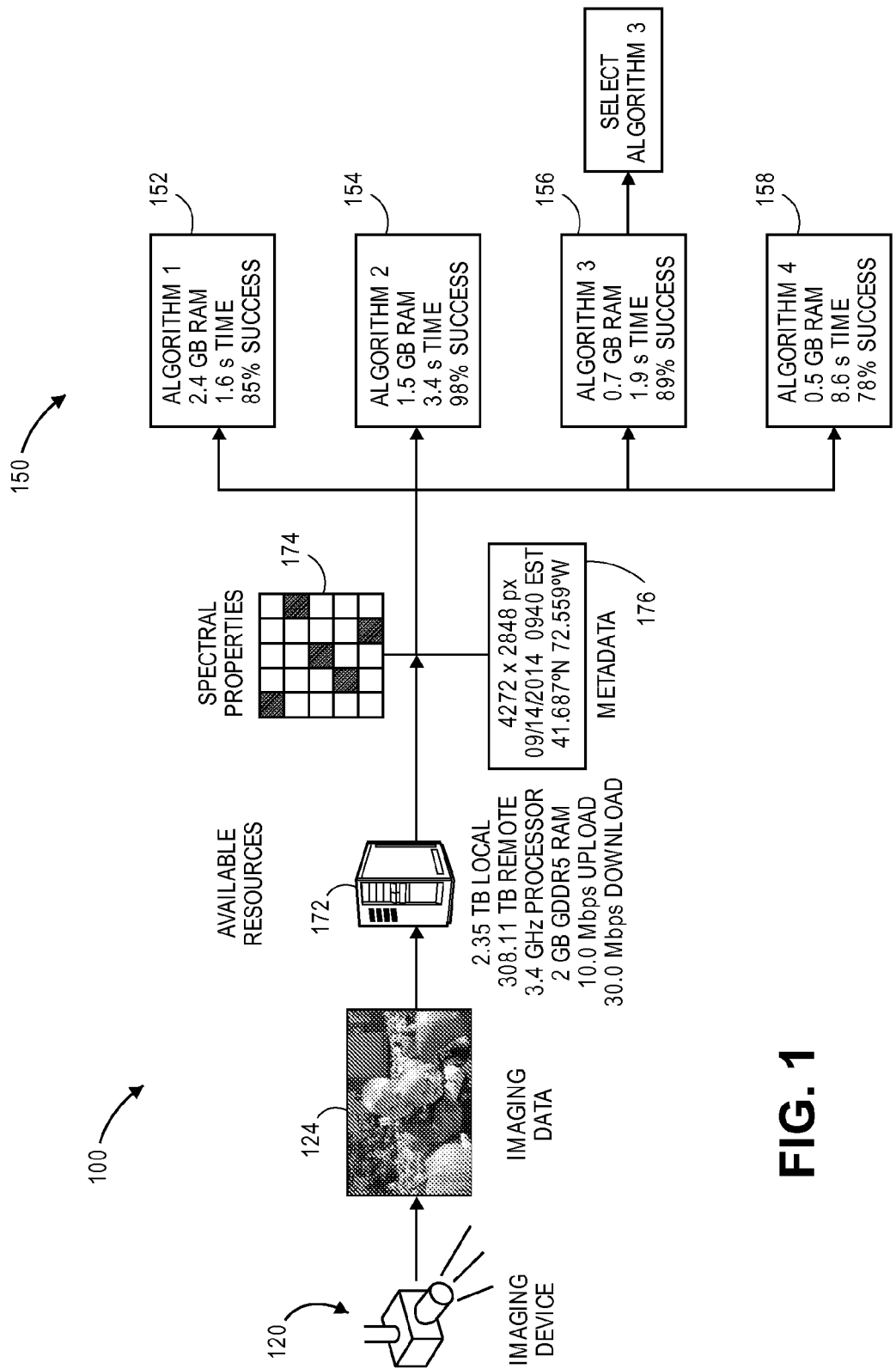
FIG. 1 is a view of aspects of a system for predicting the performance or success of algorithms in accordance with embodiments of the present disclosure.

Referring to FIG. 1, a system 100 for predicting the performance and success of large-scale vision algorithms in accordance with embodiments of the present disclosure is shown. The system 100 includes an imaging device 120 and a computing device 172 (e.g., a computer, a server or any other device having one or more computer processors operating thereon that may be provided in association with the imaging device 120) having a plurality of available resources, including local and remote storage capacity, one or more processors and random access memory (RAM) and network connectivity. As is shown in FIG. 1, the imaging device 120 captures imaging data 124 (e.g., still or moving images, as well as any relevant audio signals or other relevant information, data or metadata), and provides the imaging data 124 to the computing device 172, which may be programmed or otherwise configured to operate a plurality of algorithms 150 or other processes for evaluating or interpreting the imaging data 124.

Upon receiving the imaging data 124 from the imaging device 120, the computing device 172 may process the imaging data 124 to calculate one or more relevant spectral properties 174 of the imaging data 124, and to identify other metadata 176 regarding the imaging device 120 or the imaging data 124. For example, the spectral properties 174 may be calculated based on outputs of one or more filters (e.g., directional filters for detecting edges or other features within an image, as well as low-pass filters, high-pass filters, Laplacian filters or any other filters) applied to the imaging data 124 at different scales, and may represent properties of one or more pixels of the imaging data. Likewise, the metadata 176 may be indicative of a condition of the imaging device 120 or the environment from which the imaging data 124 was captured (e.g., a type of the imaging device 120 or an imaging sensor provided thereon, the exposure time or focal length of the imaging device 120 when the imaging data 124 was captured, environmental characteristics such as weather or lighting conditions that were occurring or present when the imaging data 124 was captured), or include one or more attributes of the imaging data 124 itself (e.g., a date, time or location at which the imaging data 124 was captured).

Based on the spectral properties 174 that were calculated using the imaging data 124, as well as any associated metadata 176 or extrinsic information that may be identified and associated with the imaging data 124 or the imaging device 120, and information regarding the computing device 172 and its available resources, the computing device 172 may predict the most appropriate one of the algorithms 150, or select a preferred one of the algorithms 150, for evaluating or interpreting the imaging data 124. For example, the computing device 172 may determine the amount or extent of the available resources of the computing device 172 that would be occupied or consumed by the execution of each of the algorithms 150, based on the spectral properties 174, or on any other relevant information or data, e.g., the metadata 176, and identify or select one of the algorithms 150 on this basis. As is shown in FIG. 1, it is predicted that a first algorithm 152 would require 2.4 gigabytes of RAM, and require 1.6 seconds to complete an execution thereof. Additionally, it is also estimated that the first algorithm 152 will have an eighty-five percent (85%) success rate. Alternatively, the most appropriate one of the algorithms 150 may be selected based on a signature or other vector representative of the spectral properties of the imaging data 124.

As is also shown in FIG. 1, it is predicted that a second algorithm 154 would require 1.5 gigabytes of RAM, and 3.4 seconds to complete an execution thereof, which is estimated to have a ninety-eight percent (98%) success rate. It is also predicted that a third algorithm 156 would require 0.7 gigabytes of RAM, and require 1.9 seconds to complete an execution thereof, which is estimated to have an eighty-nine percent (89%) success rate. It is further predicted that a fourth algorithm 158 would require 0.5 gigabytes of RAM, and require 8.6 seconds to complete an execution thereof, which is estimated to have a seventy-eight percent (78%) success rate.

The systems and methods of the present disclosure may predict or select an algorithm in order to evaluate or interpret information or data, such as the imaging data 124 of FIG. 1, based on the attributes of the imaging data and the available resources on a computing device. For example, referring again to FIG. 1, the first algorithm 152 would not likely be recommended or selected because the RAM required to execute the first algorithm 152 (viz., 2.4 gigabytes) exceeds the available RAM on the computing device 172 (viz., 2 gigabytes). The second algorithm 154 would consume less than the available RAM on the computing device 172 (viz., 1.5 gigabytes) and has a substantially high estimated rate of success (viz., ninety-eight percent) but has a relatively long time of execution (viz., 3.4 seconds). The fourth algorithm 158 would consume the smallest amount of the available RAM on the computing device 172 (viz., 0.5 gigabytes) of any of the four algorithms 152, 154, 156, 158, but has the lowest estimated rate of success (viz., seventy-eight percent) of the four algorithms 152, 154, 156, 158 and the longest time of execution (viz., 8.6 seconds).

The third algorithm 156 would consume a substantially small amount of the available RAM on the computing device 172 (viz., 0.7 gigabytes), while having the fastest time of execution (viz., 1.9 seconds) of all of the algorithms 152, 154, 156, 158 except the first algorithm 152, which, as is noted above, would require more RAM than is available on the computing device 172. Additionally, the third algorithm 156 also has a substantially high estimated rate of success (viz., eighty-nine percent). Therefore, the third algorithm 156 is identified or selected as the best-suited of the algorithms 152, 154, 156, 158 for processing the imaging data 124 according to an analysis of the performance and expected success of the algorithms 150 based on the spectral properties 172 of the imaging data 124, and any other relevant information or data.

The spectral properties 172 on which the predictions of the performance and success may be based may include any type or form of quantitative or qualitative information or data regarding the imaging data 124. In a preferred embodiment, the spectral properties 172 may relate not to any objects, persons or foreground aspects of the imaging data 124, but rather to any scene elements or other background aspects of the imaging data 124. For example, the spectral properties 172 may include or describe one or more colors or dimensions expressed in or associated with the imaging data, or one or more representations of horizontal, vertical or directional textures or edge components expressed therein. Additionally, the spectral properties 172 may include one or more indicators of pixel intensity frequency distribution, chromaticity or color saturation of the imaging data, or of pixel features at multiple scales or resolutions, as well as indicators of pixel heterogeneity or homogeneity. In this regard, predictions of performance or success for each of the algorithms 152, 154, 156, 158 may be obtained substantially quickly, e.g., faster than the actual execution of the algorithms 152, 154, 156, 158. Therefore, by identifying or selecting an algorithm that is best-suited to process imaging data at a sufficiently high level of performance, and with a sufficiently high expectation of success, the imaging data may be processed more rapidly and effectively, and with a more efficient use of a computing device's available resources, than if each of the algorithms was executed in series or in parallel.

Although the system 100 of FIG. 1 includes both the imaging device 120 and the computing device 172, such that the imaging data 124 is captured on one device and transferred to another for analysis, those of ordinary skill in the pertinent arts will recognize that these functions may be executed on a single computing device that includes both at least one component or feature for capturing or identifying information or data (e.g., a camera) and at least one component or feature for processing the information or data (e.g., a computer processor and/or memory component). Additionally, the correlation between spectral properties and/or scene tags and predictions of performance or success may be obtained by any machine learning method.

Large monitoring or surveillance networks may include tens of thousands of imaging devices, such as digital cameras, which stream vast amounts of information or data at dozens of frames and millions of bits per second. Transferring such information or data to a central server or video storage system may consume vast portions of the available network bandwidth. Additionally, the maximum number of imaging devices that may be supported within a given area through a virtual pipe of limited bandwidth is limited, and decreases as the frame rates or levels of resolution required from one or more of such imaging devices increases. Within a monitored environment having large numbers of occlusions or obstructions, or high throughput or thoroughfare rates, or a monitored environment that is spatially complex, the number of imaging devices that would be required in order to ensure an appropriate level of coverage of available events occurring therein is necessarily high. However, the volume of the information or data that would potentially be transmitted by such devices may exceed the level of network bandwidth available within the monitored environment.

Moreover, the processing power and storage capacity required to centrally receive and store the information or data captured from the imaging devices provided within such an environment may be enormous. For example, a single digital camera may capture over a terabyte of imaging data in a given day. Due to the intense processing power required in order to recognize objects or individuals expressed within such imaging data captured from thousands of imaging devices, many monitoring or surveillance networks are unable to achieve their stated goals of rapidly, accurately and efficiently capturing, indexing and storing imaging data in a central location to enable identifying and providing at least some of such imaging data in response to a query.

Imaging devices such as digital cameras operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Computer vision algorithms or other machine learning algorithms may be operated on mobile devices of various sizes or types, including but not limited to smartphones or other cell phones, tablets, video cameras or other compact computer-based machines. Such mobile devices may have limited available computer resources, e.g., network bandwidth, storage capacity or processing power, as compared to larger or more complex computer devices. Therefore, executing computer vision algorithms or other machine learning algorithms, on such devices may occupy all or much of the available resources, without any guarantee, or even a reasonable assurance, that the execution of such algorithms will be successful. For example, processing a digital photograph captured by a user of a smartphone or tablet according to one or more algorithms in order to geolocate the user based on the contents of the digital photograph, without knowing whether such the digital photograph is of a quality that can accurately support such an analysis, may be an ineffective use of the limited resources that are available on the smartphone or tablet. Similarly, where a mobile device may have multiple vision, audio comprehension or character recognition algorithms available thereon, e.g., for comprehending printed text, interpreting bar codes, or recognizing objects or items, executing each of the algorithms on a single set of imaging data including still or moving images, without regard to the attributes of the imaging data with respect to the performance of each of the algorithms, is likewise inefficient. Generally speaking, the execution of an algorithm configured to produce an output based on an input, without confidence that the algorithm can produce a reliable and accurate result based on the input, is often a waste of computing power, memory storage or time, particularly on a computing device on which power, storage and time are limited.

The systems and methods of the present disclosure are directed to making predictions as to the performance and success of one or more algorithms, such as imaging algorithms or computer vision algorithms, based on the properties of the data that is to be provided to such algorithms as inputs. For example, where a computing device having a predetermined (or determinable) set of available resources is configured to operate a plurality of algorithms for performing a given function on a set of information or data (e.g., imaging data and any related sound files or other metadata), the systems and methods disclosed herein may analyze the set of information or data to determine one or more spectral properties thereof, and select or identify the most appropriate or relevant one of the plurality of algorithms for performing the function on the set of information or data. The spectral properties may include quantitative data (e.g., statistics or figures concerning one or more pixels of imaging data, including colors or dimensions expressed therein, representations of textures or edge components, or frequencies of pixel intensities, as well as indicators of pixel homogeneity, pixel heterogeneity or pixel features at multiple scales or resolutions) or qualitative information or identifiers (e.g., labels, terms or tags describing the information or data, such as "sunny" or "occluded"), as well as any pertinent metadata associated with the imaging data or an imaging device or other device by which the information or data was captured. Such metadata may include, but is not limited to, information regarding locations, dates or times at which the information or data of the set were captured, identifiers of an imaging device, an imaging sensor or a computing device with which the information or data was captured, or any environmental characteristics (e.g., weather) or lighting conditions (e.g., natural light or artificial light) associated with the imaging data.

More generally, predicting a quality of performance, a level of accuracy, or a likelihood of failure of a computationally-intensive algorithm may be effective in determining whether the algorithm should be executed in the first place. Therefore, such a prediction may aid in determining whether the use of a computing device's resources in executing an algorithm will likely bear fruit, and may further assist in prioritizing one or more algorithms over other algorithms. For example, in a fulfillment center environment, many items may pass within the fields of view of one or more imaging devices, e.g., on a conveyor, occasionally within one or more containers.

Imaging data regarding such items or containers may be captured using one or more of the imaging devices and processed according to one or more algorithms, such as imaging algorithms or computer vision algorithms. For example, the imaging data may be processed in order to read any alphanumeric characters (e.g., text, numbers or symbols) or interpret any markings (e.g., one-dimensional bar codes or two-dimensional "QR" codes) provided thereon. Likewise, the imaging data may be subjected to one or more transformation, combination, measurement or conversion processes according to one or more of such algorithms. Each of the respective algorithms may have a different performance profile based on the time required in order to complete one or more computations on the imaging data, the accuracy of such computations, or the amount of memory or storage space required in order to complete such computations, and the time, the accuracy or the amount of memory or storage space may depend on the quality of the imaging data. For example, one algorithm may perform well using imaging data captured from darkly lit, low contrast scenes, but may consume a substantial amount of processing power or memory. Another algorithm may consume fewer resources (e.g., processing power or memory) but may require longer computational times, and have limited effectiveness where images are not well-lit or do not include high contrast. Selecting an algorithm to be executed in view of the quality of input data is more likely to lead to an optimal utilization of a computing device's resources while improving the accuracy and rate of success of the obtained output.

The benefits of predicting the accuracy and probability of success of an algorithm, e.g., a computer vision algorithm or other machine learning algorithm, or any type of algorithm for performing a high-level cognitive interpretation, are maximized in computing environments in which the resources and time required for obtaining an output from an algorithm are constrained. More specifically, where a high-level algorithm pipeline includes a number of limiting stages or steps, the likelihood that the algorithm or a computing device on which the algorithm is executed will fail is higher at latter stages or steps of the pipeline. Through data-driven or data-centric approaches to selecting and executing algorithms, improved performance of large-scale systems may be achieved, as the data considered by such algorithms may be varied and include frequency distributions having one or more long tails. Machine learning algorithms are usually fitted to smaller subsets of training data, and there can be multiple algorithms that model different subsets of data.

The selection and execution of algorithms, or the predicted performance of algorithms, based on input data requires selecting data attributes that most closely model the characteristics of the algorithms. However, identifying and selecting such attributes is challenging, as there may or may not be a single deterministic data-specific component that is critical to an algorithm's performance. Nevertheless, because a large-scale system comprising dozens or hundreds of imaging devices may capture massive amounts of incoming imaging data, and execute one or more instances of individual algorithms in local (e.g., on one or more of the imaging devices themselves) or remote (e.g., cloud-based) locations every day, and receive feedback regarding the quality of the outputs obtained from such algorithms, the systems and methods disclosed herein may be configured to predict the performance or success of an algorithm based on the quality of the inputs (e.g., one or more attributes of the imaging data) provided thereto.

Some of the attributes of imaging data that may be considered when predicting the performance or success of an algorithm include, but are not limited to, low-level pixel statistics of one or more images or video files, such as a normalized pixel variance of each color channel, as well as variances of Laplacian operators, sums of modified Laplacian operators, Tenengrad methods or algorithms, modified Tenengrad methods or algorithms, image contrasts or color histogram entropies. Such low-level pixel attributes may encode or represent physical properties of the natural or man-made scenes expressed within imaging data. For example, an outdoor scene having foliage or an indoor scene within an industrial environment may be characterized in terms or with identifiers corresponding to the degree of roughness or homogeneity of their respective textural components.

Spectral properties of real-world scenes expressed in imaging data may be calculated based on outputs of a bank including one or more filters operating at different scales. Such filters may be provided for any image processing operation, including but not limited to character recognition, determination of structure from motion, edge detection, image-based three-dimensional modeling, image combination, image compression, image conversion, image correction, image filtering, image measurement, image modeling, image noise reduction, image quantization, image sampling, image scaling, image segmentation, image sharpening, image smoothing, image transformation, image zooming, imaging device pose estimation, imaging device-intrinsic parameter determination, object classification, object detection, object recognition, object segmentation, or object tracking. Image filters are typically defined by a small array (e.g., a kernel) that may be applied to a specific pixel and one or more neighboring pixels within a set of imaging data. In some implementations, an array or kernel is aligned on the specific pixel, and includes a square of pixels geometrically centered around the specific pixel. Applying a filter to a set of imaging data, or a portion of such a set, is a process sometimes called convolution, which is occasionally applied in a spatial or frequency context.

Image filtering is useful for many applications, including smoothing, sharpening, removing noise, and edge detection. A filter is defined by a kernel, which is a small array applied to each pixel and its neighbors within an image. In most applications, the center of the kernel is aligned with the current pixel, and is a square with an odd number (3, 5, 7, etc.) of elements in each dimension. The process used to apply filters to an image is known as convolution, and may be applied in spatial or frequency domains. For example, in some implementations, a convolution may multiply elements of an array by matching pixel values when the kernel is centered over a single pixel, and the resulting array of values is averaged and substituted for the value of the original single pixel. In some other implementations, a convolution may transform an image from a spatial domain to a frequency domain by multiplying a fast Fourier transform (or "FFT") of an image by a FFT of an array centered about a pixel, e.g., a forward FFT, thereby dissolving the image into sines or cosines of various amplitudes or phases representing frequencies in horizontal or vertical directions. Such a frequency representation is indicative of the repetition of patterns or variations within an image. After the forward FFT has been completed on a set of imaging data, and the imaging data has been processed within a frequency domain, the imaging data may be transformed back into the spatial domain by an inverse FFT.

Accordingly, in some embodiments of the present disclosure, the spectral properties may be calculated using a fast Fourier transform or other Fourier analysis algorithm, and may be holistic in nature. The spectral properties may be calculated independent of the individual objects or structures expressed in a scene, and may instead be representative and diagnostic of a physical layout of the scene, as the scene is projected within a view of a camera. In some embodiments, directional filters may be convolved with RGB channels of an entire set of imaging data, and the outputs of such filters may be normalized to values between zero and one.

Previously, psychophysics experiments on visual perception have suggested that human visual attention, e.g., the selective filtering of relevant information from irrelevant information in a crowded scene that occurs in the human brain, may be mentally performed using a global statistical representation of a viewed scene. Similarly, the outputs of low-level feature detectors and frequency responses of individual multi-dimensional filters across a substantially large image can be effectively used to summarize a scene expressed in the image in a holistic, compact, and context-based manner that is independent of individual parts, objects, and clutter expressed in the image. In a preferred embodiment of the present disclosure, such a representation of a scene is derived from spectral properties of an image that may be identified using a pyramid of steerable filters in multiple orientations and at different spatial frequency scales, in addition to a discrete Fourier transform (or "DFT") of the image obtained using a fast Fourier transform or other Fourier analysis algorithm. Multi-scale directional filters may capture a statistical layout of the orientation and spatial spectral properties of the scene.

For a given set of imaging data (e.g., one or more still or moving images), a spectral signature may be defined as a weighted combination of the outputs of the spectral properties and/or the magnitudes of the responses of the multi-scale directional filters, or a vector representative of such outputs or responses. The spectral properties may be computed for each of the color channels and over non-overlapping regions in an image, and arranged in a grid. For example, low-scale filter responses may capture a spatial layout of a scene, while higher-scale filter responses may encode a distribution of details, structures or textures in the scene. Additionally, a spectral signature may include amplitudes or phases of a DFT that represent spatial frequencies over an entire set of imaging data (e.g., an entire image) and may, therefore, encode attributes such as orientation, smoothness or roughness, or a distribution of boundaries or edges in the imaging data. For example, a DFT component of a spectral signature may comprise a plurality of values of magnitudes of DFT frequency representations. In some embodiments, the DFT component may include five values of magnitudes taken at nominal percentages (e.g., ninety-five percent, ninety percent, eighty percent, seventy percent and fifty percent, or 95%, 90%, 80%, 70% and 50%) of the total energy expressed in a set of imaging data.

According to some embodiments of the present disclosure, spectral properties of a scene expressed within imaging data, e.g., spectral components of the imaging data and/or spectral signatures derived from such components, may be used to encode real-world holistic scene tags or scene properties using standard terms or terminology such as "natural," "manmade," "structured," "passageway," "foliage," "indoors," "outdoors," "open," "clutter," "uniform/low texture," "high occlusions," "naturally lit," "fluorescent lit," "bulb lit," "dimly lit," "directionally lit," "oblique view," "top-down view," "horizontal view," "low depth," "large depth," "panorama," "wide-angle view," "narrow view," "dynamic scene," "static/slow moving scene," "high reflection," "high shadow," "high glare," "high contrast," "low contrast" or "foggy." Such terms may refer to one or more characteristics of a scene, and not necessarily any of the individual objects therein. More specifically, spectral properties may be defined independently of the objects within the scene, and may be both representative and diagnostic of the physical space within the field of view of an imaging device sensor, and not necessarily the objects or structures which compose the scene. In this regard, scene tags may be estimated based on spectral properties of an image, and without having to perform any object detection or recognition, image segmentation or grouping operations, as well.

The prediction of performance metrics or success rates based on spectral properties, scene tags, or like attributes of imaging data may be obtained by any means or method in accordance with the present disclosure. For example, a plurality of algorithms may execute a training set of imaging data, and one or more performance metrics for each of the algorithms (e.g., amounts of memory consumed by each of the plurality of algorithms, levels of accuracy or precision of outputs, expected rates of success or expected times of execution) with respect to the training set of imaging data may be identified. Additionally, spectral properties and/or scene tags of the training set of imaging data may also be identified, and the performance metrics or rates of success of each of the algorithms may be correlated with the spectral properties and/or scene tags, according to one or more machine learning tools or algorithms, or like systems. For example, a spectral property and/or scene tag or label may be associated with a predicted performance metric or rate of success according to one or more machine learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure provide a number of advantages over existing systems for predicting or characterizing success or failure of an algorithm. First, the systems and methods disclosed herein predict the performance and accuracy of a vision algorithm based at least in part on the semantic (e.g., word-based) properties of a natural scene. For example, where imaging data may be classified with semantic scene tags such as "sunny," "high contrast" or "narrow view," algorithms that are known to adequately and successfully process images that are classified as "sunny," "high contrast" or "narrow view" may be selected for processing the imaging data. Likewise, the performance or success of such algorithms may be estimated based on the semantic properties of the imaging data. For example, some facial detection and recognition algorithms may be deemed more likely to succeed in "low depth," "horizontal view" and "open" scenes, and not in "low depth," "indoors" or "top-down view" scenes, or "large depth," "outdoor," or "oblique view" scenes.

In accordance with the present disclosure, statistical representations of the spatial properties (e.g., layout) of a scene may be leveraged to determine or predict whether a specific vision algorithm will succeed or fail. More particularly, the performance or success of an algorithm may be determined or predicted without detecting or recognizing any individual objects (e.g., faces or text) or the properties thereof (e.g., scales, sizes or other attributes or properties). In this regard, information regarding the predicted performance or success of algorithms may be used for any purpose. For example, an algorithm may be selected for processing imaging data based on any relative or absolute attribute indicative of the performance or success of the algorithm (e.g., an estimated success rate, a time or a percent accuracy of the algorithm). Likewise, the systems and methods of the present disclosure may be further utilized in determining locations or operating characteristics of any individual cameras within a network.

Figure 2:
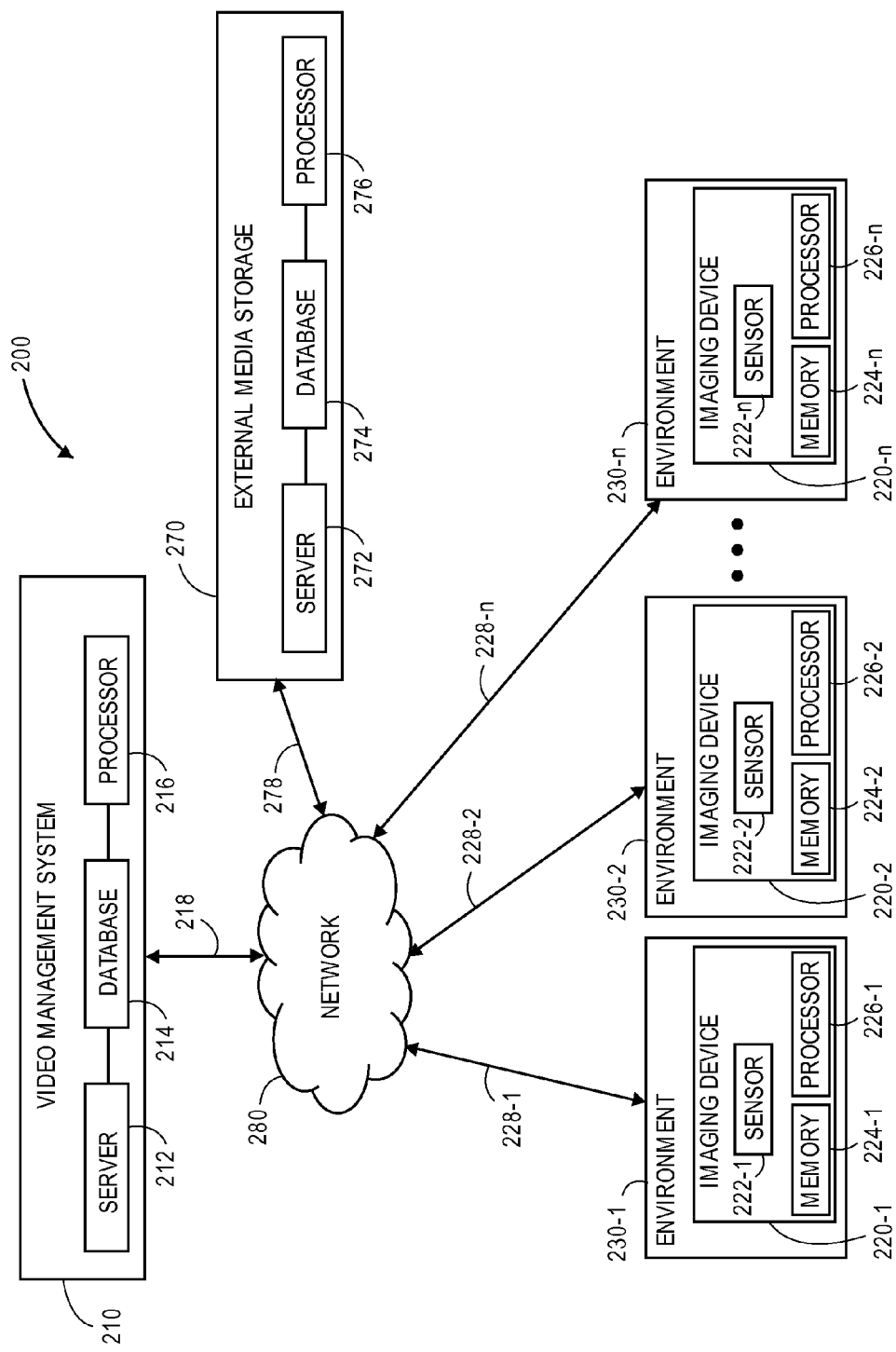
FIG. 2 is a block diagram of components of one system for predicting the performance or success of algorithms in accordance with embodiments of the present disclosure.

Referring to FIG. 2, a block diagram of components of one system 200 for predicting the performance and success of large-scale vision algorithms in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in the system 100 of FIG. 1.

The system 200 of FIG. 2 includes a video management system 210, a plurality of environments 230-1, 230-2 . . . 230-*n* having a plurality of n imaging devices 220-1, 220-2 . . . 220-*n* therein and an external media storage facility 270 connected to one another across a network 280, such as the Internet.

The video management system 210 of FIG. 2 includes one or more physical computer servers 212 having a plurality of databases 214 associated therewith, as well as one or more computer processors 216 provided for any specific or general purpose. For example, the video management system 210 of FIG. 2 may be independently provided for the exclusive purpose of managing the monitoring of video files or other imaging data captured by the imaging devices 220-1, 220-2 . . . 220-*n* or, alternatively, provided in connection with one or more physical or virtual services configured to manage or monitor such files, as well as one or more other functions. The servers 212 may be connected to or otherwise communicate with the databases 214 and the processors 216. The databases 214 may store any type of information or data, including digital media files or any like files containing multimedia (e.g., audio and/or video content), for any purpose. The servers 212 and/or the computer processors 216 may also connect to or otherwise communicate with the network 280, as indicated by line 218, through the sending and receiving of digital data.

The imaging devices 220-1, 220-2 . . . 220-*n* may comprise any form of optical recording sensor or device that may be used to photograph or otherwise record information or data regarding activities occurring within one or more areas or regions of a given environment 230-1, 230-2 . . . 230-*n*, or for any other purpose. As is shown in FIG. 2, the imaging devices 220-1, 220-2 . . . 220-*n* are connected to the network 280 and each include sensors 222-1, 222-2 . . . 222-*n*, memory or storage components 224-1, 224-2 . . . 224-*n* (e.g., a database or another data store), processors 226-1, 226-2 . . . 226-*n* and any other components that may be required in order to capture, analyze and/or store imaging data from within the environments 230-1, 230-2 . . . 230-*n* in which the imaging devices 220-1, 220-2 . . . 220-*n* are provided. For example, such imaging devices 220-1, 220-2 . . . 220-*n* may capture one or more still or moving images, along with any relevant audio signals or other information, and may also connect to or otherwise communicate with one another, or with the network 280, as indicated by lines 228-1, 228-2 . . . 228-*n*, through the sending and receiving of digital data. Although the system 200 shown in FIG. 2 includes n imaging devices 220-1, 220-2 . . . 220-*n* therein, provided in n environments 230-1, 230-2 . . . 230-*n*, any number or type of imaging devices or sensors may be provided within a given environment in accordance with the present disclosure.

The environments 230-1, 230-2 . . . 230-*n* may be any facilities, stations or locations within which one or more of the plurality of n imaging devices 220-1, 220-2 . . . 220-*n* may be installed and provided for performing monitoring and/or surveillance of activities occurring therein. According to one embodiment, the environments 230-1, 230-2 . . . 230-*n* may include a fulfillment center, a warehouse or other like facility; a financial institution, such as a bank or trading floor; a transportation hub or station, such as an airport, a train station or a bus station; or a stadium, a theater, a shopping center or another large-scale venue; or portions thereof. Those of ordinary skill in the pertinent art will recognize that the systems and methods of the present disclosure are not limited by any activities that may be performed or functions that may be provided by the environments 230-1, 230-2 . . . 230-*n*.

One or more of the environments 230-1, 230-2 . . . 230-*n* may further include one or more workers or staff members (not shown) who may conduct one or more operations within an environment 230-1, 230-2 . . . 230-*n*, e.g., handling or transporting one or more items within a fulfillment center, a warehouse or other like facility; receiving or disbursing funds in a financial institution, such as a bank or trading floor; arriving at or departing from a transportation hub or station, such as an airport, a train station or a bus station, as well as a stadium, a theater, a shopping center or another large-scale venue. Such workers may operate one or more computing devices or machines, e.g., a general purpose device such a personal digital assistant, a digital media player, a smartphone, a tablet computer, a desktop computer or a laptop computer, which may include any form of input and/or output peripherals such as scanners, readers, keyboards, keypads, touchscreens or like devices. Additionally, such workers may operate tools or other implements for handling or transporting items within the environments 230-1, 230-2 . . . 230-*n*, such as by removing the items from a car, truck, ship or aircraft, placing the items onto a crane, jack, belt or another conveying apparatus at a receiving station, transporting the items to a shelf, bin, rack, tier, bar, hook or other storage means within a storage area, retrieving the items from such a storage means within the storage area, transporting the items to a defined region within a distribution station, and preparing the items for delivery to one or more customers.

The environments 230-1, 230-2 . . . 230-*n* may further include any number of objects such as items, structural features, facilities, vehicles, tools, implements, surfaces or pieces of equipment, or any other objects, people or other entities from which imaging data or other information or data may be captured. Such entities may have any size, shape, mass, volume, surface area, texture, color, reflectance, silhouette, surface contour or variations, or any other qualities in accordance with the present disclosure. For example, where one or more of the environments 230-1, 230-2 . . . 230-*n* comprises all or a portion of a fulfillment center, the environments 230-1, 230-2 . . . 230-*n* may include one or more receiving stations featuring any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers.

The environments 230-1, 230-2 . . . 230-*n* may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The environments 230-1, 230-2 . . . 230-*n* may further include one or more distribution stations where items that have been retrieved from a designated storage area may be evaluated, prepared and packed for delivery from one or more of the environments 230-1, 230-2 . . . 230-*n* to addresses, locations or destinations specified by customers, also by way of carriers such as cars, trucks, trailers, freight cars, container ships or cargo aircraft (e.g., manned aircraft or unmanned aircraft, such as drones).

The environments 230-1, 230-2 . . . 230-*n* may further include one or more order processing and/or communication systems using computer devices in communication with one or more of the server 212, the database 214 and/or the processor 216 of the video management system 210, the processors 226-1, 226-2 . . . 226-*n* of the imaging devices 220-1, 220-2 . . . 220-*n* within the environments 230-1, 230-2 . . . 230-*n*, or the server 272, the database 274 and/or the processor 276 of the external media storage facility 270, or through one or more other computing devices or machines that may be connected to the network 280, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding operations within the environments 230-1, 230-2 . . . 230-*n*, or the interactions received from the one or more operators, users or workers.

Moreover, the environments 230-1, 230-2 . . . 230-*n* may further include one or more control systems that may generate instructions for conducting operations therein. Such control systems may be in communication with one or more of the processors 226-1, 226-2 . . . 226-*n* of the imaging devices 220-1, 220-2 . . . 220-*n*, one or more workers (not shown), or any other computer systems, objects or machinery operated therein. For example, such control systems may be associated with one or more other computing devices or machines, and may communicate with the video management system 210, the external media storage facility 270 or one or more other computer devices (not shown) over the network 280, through the sending and receiving of digital data.

The external media storage facility 270 may be any facility, station or location having the ability or capacity to receive and store information or data, such as digital media files, in one or more data stores, e.g., digital media files received from the video management system 210, one or more of the imaging devices 220-1, 220-2 . . . 220-*n* or the environments 230-1, 230-2 . . . 230-*n*. As is shown in FIG. 2, the external media storage facility 270 includes one or more physical computer servers 272 having a plurality of databases 274 associated therewith, as well as one or more computer processors 276. The servers 272 may be connected to or otherwise communicate with the databases 274 and the processors 276. The databases 274 may store any type of information or data, including digital media files or any like files containing multimedia (e.g., audio and/or video content), for any purpose. The servers 272 and/or the computer processors 276 may also connect to or otherwise communicate with the network 280, as indicated by line 278, through the sending and receiving of digital data.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The video management system 210, the monitored environment 230 or the external media storage facility 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the server 212 may be adapted to transmit information or data in the form of synchronous or asynchronous messages from the video management system 210 to any of the processors 226-1, 226-2 . . . 226-$n$ of the imaging devices 220-1, 220-2 . . . 220-$n$ within the environments 230-1, 230-2 . . . 230-$n$, or any other computer device in real time or in near-real time, or in one or more offline processes, via the network 280. Those of ordinary skill in the pertinent art would recognize that the video management system 210, the environments 230-1, 230-2 . . . 230-$n$ or the external media storage facility 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the processors 226-1, 226-2 . . . 226-$n$, the server 272, or any other computers or control systems utilized by the video management system 210, or the external media storage facility 270, or within the environments 230-1, 230-2 . . . 230-$n$, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
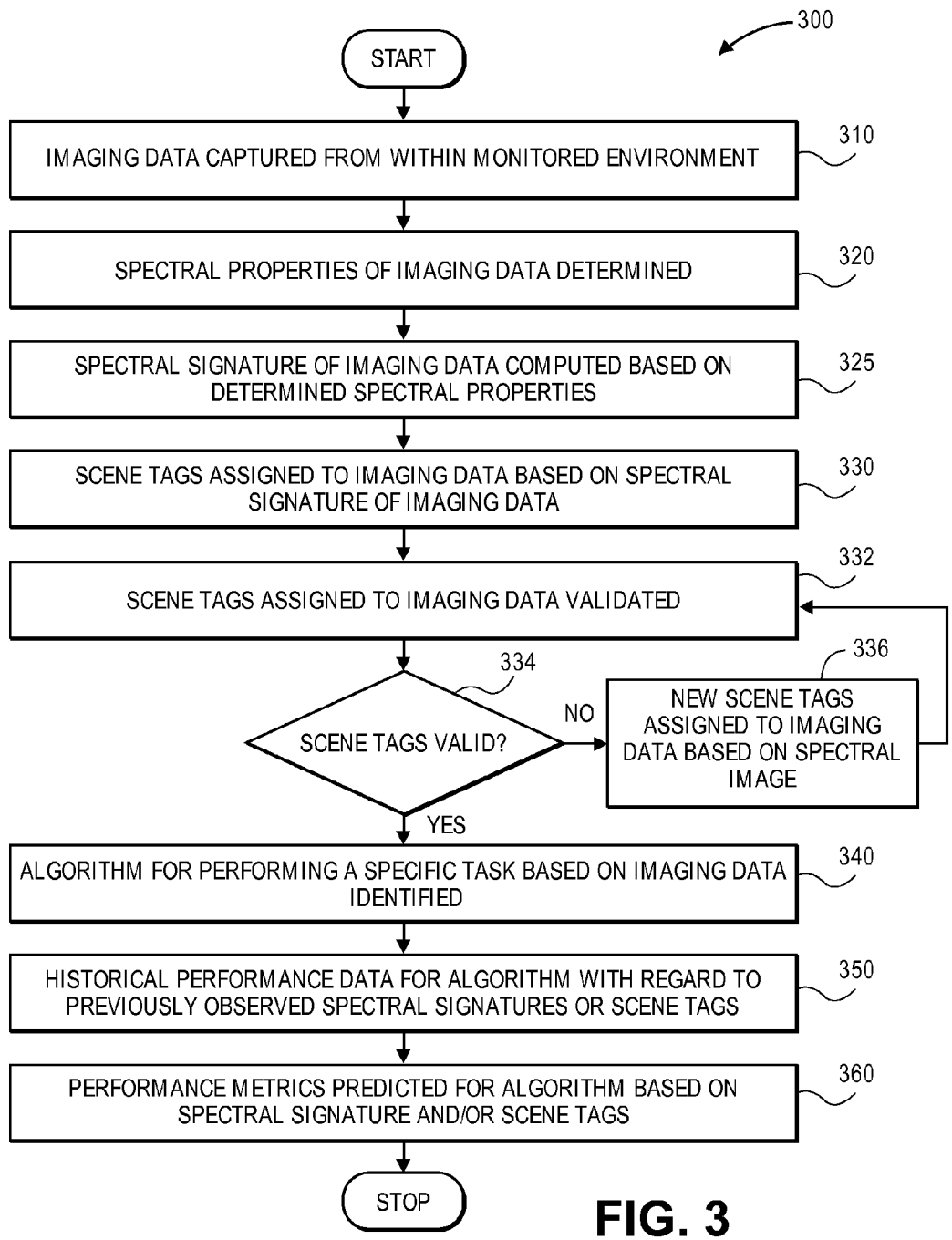
FIG. 3 is a flow chart of one process for predicting the performance or success of algorithms in accordance with embodiments of the present disclosure.

As is discussed above, the systems and methods of the present disclosure may be directed to selecting or identifying an algorithm for performing a specific, discrete task or function regarding information or data, e.g., imaging data, by determining one or more qualitative or quantitative properties of the information or data and predicting, based on such properties, one or more metrics regarding the performance or success of such algorithms. Referring to FIG. 3, a flow chart 300 representing one embodiment of a process for predicting the performance and success of large-scale vision algorithms in accordance with the present disclosure is shown. At box 310, imaging data is captured from within a monitored environment, e.g., from one or more imaging devices configured to capture and store imaging data in the form of still or moving images and any relevant audio signals or other relevant information, data or metadata. For example, the imaging devices may be provided in a fulfillment center, an airport or a trading floor.

At box 320, one or more spectral properties of the imaging data are determined. The spectral properties may relate to one or more scenes expressed within the imaging data, e.g., a background or other element representative of attributes of the imaging data, or the context in which the imaging data was captured, and may be calculated using any algorithms or methods such as a FFT. For example, the spectral properties may relate to a size, a shape or a level of resolution of one or more still or moving images included in the imaging data, or any other numerical factors or characteristics of the imaging data. At box 325, a spectral signature of the imaging data is computed based on the determined spectral properties. For example, the spectral signature may comprise a vector of one or more spectral properties and may represent one or more encoded properties of the scenes expressed within the imaging data, or a general description of the imaging data that incorporates or implies one or more of the spectral properties.

At box 330, one or more scene tags of the imaging data are assigned to the imaging data based on the spectral signature of the imaging data. The scene tags may include text-based references to the content of the imaging data such as "dimly lit," "panorama" or "lengthy shadows," or other terms or terminology which relate to one or more general properties of a scene (e.g., background features or elements), and not necessarily to any of the objects, persons or other entities shown therein. For example, where imaging data is determined to include swaths of grey or black separated by a white or yellow marking in the form of a dashed line or double-stripe, the imaging data may be predicted to include a road, a street or a highway. Where the imaging data is determined to include a distinct region of light blue or grey, and a distinct region of green or brown, the imaging data may be predicted to include a farm or other pastoral scene. The predictions of the scene tags according to the present disclosure may be made based on any historical data, a training set or a specifically programmed algorithm or technique, or in any other manner.

At box 332, the scene tags assigned to the imaging data are validated. For example, where the scene tags include labels such as "sunny" or "artificial light," the imaging data may be processed in order to determine whether the imaging data actually includes one or more sunny scenes, or scenes that are illuminated by artificial light sources. At box 334, whether the scene tags are valid is determined. If the scene tags are not valid, the process advances to box 336, where new scene tags are assigned to the imaging data based on the spectral signature of the imaging data computed at box 325, and to box 332, where the scene tags are validated. If the scene tags are valid, the process advances to box 340, where an algorithm for performing a specific task based on the imaging data is identified. The algorithm may be one of a plurality of algorithms for executing the specific task, and may be executable by the device that captured the imaging data (e.g., a smartphone, a tablet computer or any other form of computing device having an imaging device provided thereon), or by a separate device, such as is shown in the system 100 of FIG. 1.

At box 350, historical performance data for the algorithm with regard to previously observed spectral signatures or scene tags is identified. The data may describe or relate to the prior execution of the algorithm on other sets of imaging data, which may include imaging data having one or more of the spectral properties of the imaging data captured at box 310, or a spectral signature similar to the signature computed at box 325, as well as one or more of the scene tags validated at box 334. The data may also indicate, or be used to determine, information regarding the performance of the algorithm with regard to various spectral signatures or scene tags, as well as probabilities or other metrics representative of the success of the algorithm in performing the specific task on such other sets of imaging data.

At box 360, one or more performance metrics (e.g., an amount of memory consumed, a level of accuracy or precision of outputs, a rate of success or a time of execution) are predicted for the algorithm based on the spectral signature that was determined based on the spectral properties of the imaging data, and the scene tags assigned to the imaging data, and the process ends. Using the historical performance data identified at box 350, and either or both of the spectral signature computed at box 325 or the scene tags validated at box 334, a prediction of the performance metrics may be made.

Figure 4:
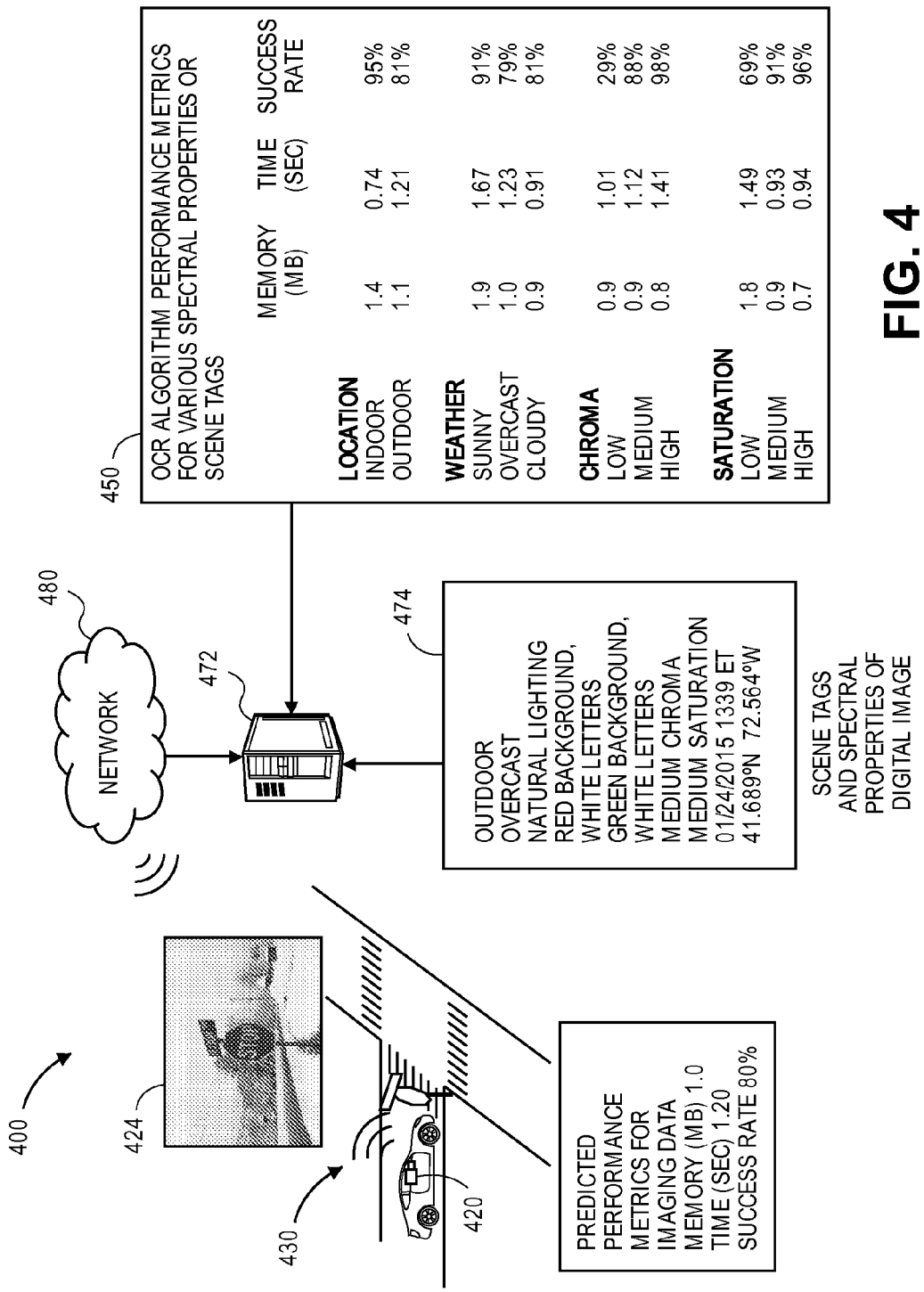
FIG. 4 is a view of aspects of a system for predicting the performance or success of algorithms in accordance with embodiments of the present disclosure.

One example of a system for identifying an algorithm for performing a task using information or data based on attributes of the information or data is shown in FIG. 4. Referring to FIG. 4, a system 400 for predicting the performance and success of algorithms in accordance with embodiments of the present disclosure is shown. Except where otherwise noted, reference numerals preceded by the number "4" shown in the system 400 of FIG. 4 indicate components or features that are similar to components or features having reference numerals preceded by the number "2" shown in the block diagram 200 of FIG. 2, or by the number "1" shown in the system 100 of FIG. 1.

As is shown in FIG. 4, the system 400 includes an imaging device 420 that is provided on an automobile 430 and configured to capture imaging data 424, and to transmit the imaging data 424 to a computing device 472 via a network 480, e.g., by wired or wireless means. The computing device 472 is configured to determine one or more spectral properties or scene tags 474 of the imaging data 424, and to perform one or more algorithms on the imaging data 424 in order to perform a specific task or a given function (e.g., optical character recognition). The spectral properties 474 may include one or more descriptors of background elements expressed in the imaging data 424 (e.g., "outdoor," "overcast," "natural lighting"), as well as any labels representative of the imaging data 424 such as "medium chroma" or "medium saturation." Additionally, the spectral properties 474 may also include or be augmented by metadata such as a date, a time or a location at which the imaging data 424 was captured, or any other relevant information or data.

Based on the attributes of the imaging data, the performance or rate of success of an algorithm in processing the imaging data 424 in order to perform the specific task or the given function may be predicted based on historically observed performance metrics 450 of the algorithm for various types of imaging data. As is shown in FIG. 4, the performance metrics 450 may include, but are not limited to, the amount of memory required to execute the algorithm, the time required in order to execute the algorithm, or the rate of success of the algorithm, in processing imaging data having various spectral properties or scene tags. For example, in order to process imaging data having an "indoor" scene tag, the performance metrics 450 indicate that the algorithm requires 1.4 megabytes and 0.74 seconds in order to complete an execution thereof, at a ninety-five percent (95%) rate of success. In order to process imaging data having an "outdoor" scene tag, however, the performance metrics 450 indicate that the algorithm requires just 1.1 megabytes of memory and 1.21 seconds, but has an eighty-one percent (81%) rate of success. Thus, the performance metrics 450 indicate that the algorithm delivers superior results in a shorter period of time when imaging data is captured indoors versus outdoors, but requires more memory.

Similarly, with regard to weather, the performance metrics 450 indicate that when imaging data has a "sunny" scene tag, the algorithm requires 1.9 megabytes of memory and 1.67 seconds, and has a ninety-one percent (91%) rate of success. When the imaging data has an "overcast" scene tag, the algorithm requires 1.0 megabytes of memory and 1.23 seconds, and has a seventy-nine percent (79%) rate of success, and when the imaging data has a "cloudy" scene tag, the algorithm requires 0.9 megabytes of memory and 0.91 seconds, and an eighty-one percent (81%) rate of success. With regard to chromaticity (or chroma), when imaging data has a "low" chroma scene tag, the algorithm requires 0.9 megabytes of memory and 1.01 seconds, and has a twenty-nine percent (29%) rate of success. When the imaging data has a "medium" chroma scene tag, the algorithm requires 0.9 megabytes of memory and 1.12 seconds, and has an eighty-eight percent (88%) rate of success, and when the imaging data has a "high" chroma scene tag, the algorithm requires 0.8 megabytes of memory and 1.41 seconds, and has a ninety-eight percent (98%) rate of success.

Finally, with regard to saturation, when imaging data has a "low" saturation scene tag, the algorithm requires 1.8 megabytes of memory and 1.49 seconds, and has a sixty-nine percent (69%) rate of success. When the imaging data has a "medium" saturation scene tag, the algorithm requires 0.9 megabytes of memory and 0.93 seconds, and has a ninety-one percent (91%) rate of success, and when the imaging data has a "high" saturation scene tag, the algorithm requires 0.7 megabytes of memory and 0.94 seconds, and has a ninety-six percent (96%) rate of success.

Therefore, using the spectral properties 474 of the imaging data 424, and the historical metrics 450, a prediction as to the performance and the success of the algorithm in processing the imaging data 424 may be obtained. For example, as is shown in FIG. 4, based at least in part on the scene tags of the spectral properties 474 such as "outdoor," "overcast," "medium chroma" and "medium saturation," the performance metrics predicted for the processing of the imaging data 424 by the algorithm include a requirement of 1.0 megabytes of memory and 1.20 seconds in order to complete an execution thereof, and would have an estimated eighty percent (80%) rate of success.

Figure 5:
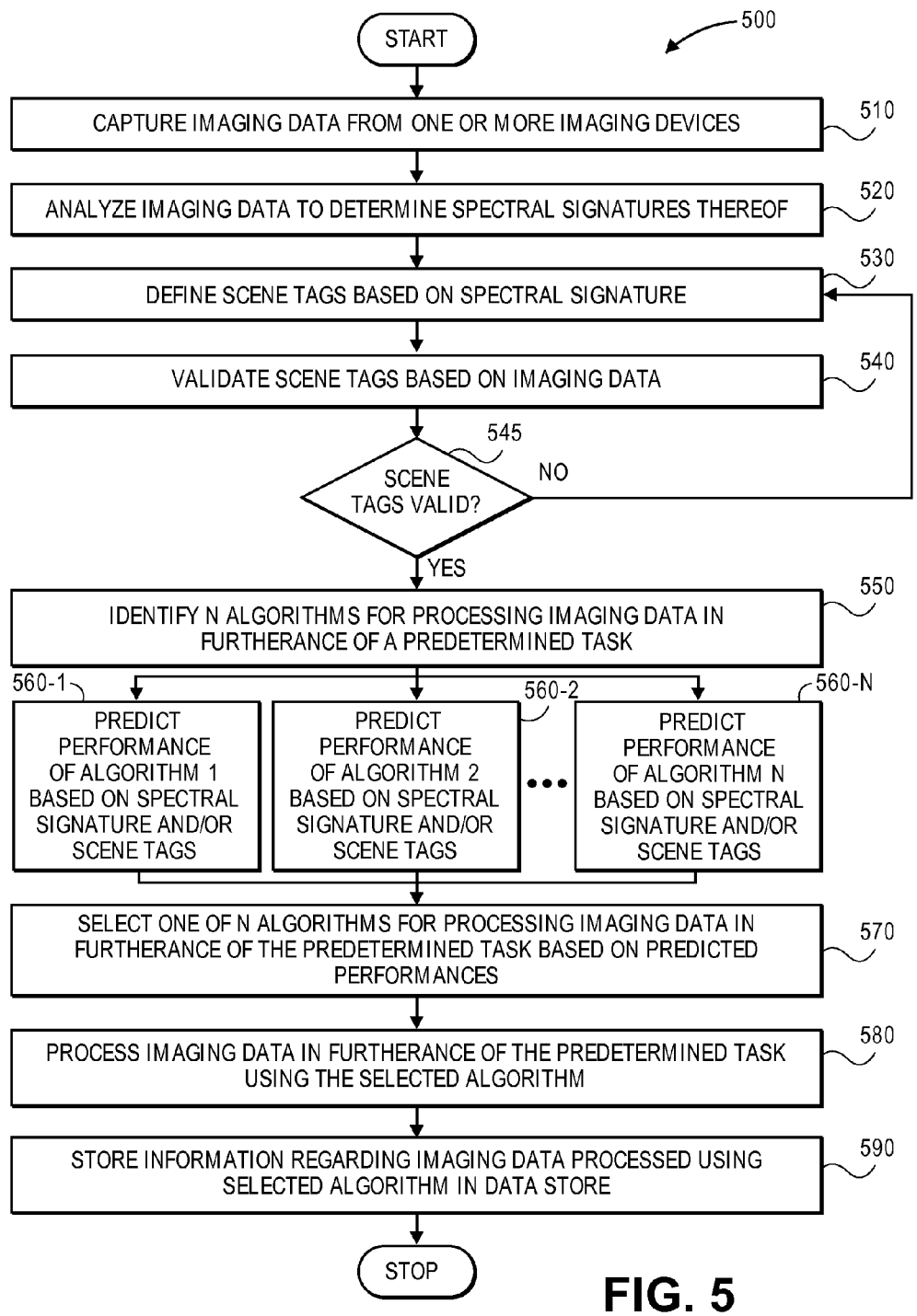
FIG. 5 is a flow chart of one process for predicting the performance or success of algorithms in accordance with embodiments of the present disclosure.

By predicting performance metrics for a plurality of algorithms with respect to attributes of imaging data, e.g., spectral properties of the imaging data, a spectral signature representative of one or more such properties, or scene tags derived based on such properties or such a signature, a preferred or most optimal one of the plurality of algorithms may be selected or identified, thereby avoiding the requirement to process the imaging data according to each of the algorithms in order to determine which of the algorithms is best. Referring to FIG. 5, a flow chart 500 of one process for predicting the performance and success of algorithms in accordance with embodiments of the present disclosure is shown.

At box 510, imaging data is captured from one or more imaging devices, and at box 520, the imaging data is analyzed in order to determine one or more spectral signatures thereof. For example, as is discussed above, a spectral signature may be defined based on the spectral properties observed in each of the respective sets of imaging data. At box 530, one or more scene tags, such as "panorama, "medium glare" or "snowy" are defined based on the spectral signatures.

At box 540, the scene tags are validated based on the imaging data, and at box 545, if the scene tags are determined to be invalid, the process returns to box 530, where new scene tags are defined for the imaging data based on the spectral signatures. If the scene tags are determined to be valid, the process advances to box 550, where a plurality of n algorithms is identified for processing the imaging data in furtherance of a predetermined task. For example, the predetermined task may include or comprise any function relating to the respective sets of imaging data, including but not limited to character recognition, determination of structure from motion, edge detection, image-based three-dimensional modeling, image combination, image compression, image conversion, image correction, image filtering, image measurement, image modeling, image noise reduction, image quantization, image sampling, image scaling, image segmentation, image sharpening, image smoothing, image transformation, image zooming, imaging device pose estimation (e.g., position or orientation), imaging device-intrinsic parameter determination (e.g., focal length or spherical distortion), object classification, object detection, object recognition, object segmentation, or object tracking.

Subsequently, and in parallel, at boxes 560-1, 560-2 . . . 560-n, the performance of each of the respective n algorithms may be predicted based on the spectral signature determined at box 520 or the scene tags defined at box 530. For example, referring again to FIG. 4, based on the spectral properties 474 and the historically observed performance metrics 450, performance metrics of the respective n algorithms, including data or metrics regarding the amount of resources that would be consumed if each of the n algorithms were to be executed, or the time required in order to execute each of the n algorithms, as well as levels of accuracy or precision of outputs of each of the n algorithms or rates of success that could be expected if each of the n algorithms was to be executed for a specific purpose, may be predicted.

At box 570, one of the n algorithms for processing the imaging data in furtherance of the predetermined task is selected based on the predicted performances. For example, the one of the n algorithms may be selected based at least in part on the resources that are available on a given computing device, as well as the amount of time (e.g., a deadline) that may be required in order to have the task performed, or a minimum threshold expected level of success. At box 580, the imaging data is processed in furtherance of the predetermined task using the selected algorithm. At box 590, information regarding the imaging data processed using the selected algorithm is stored in at least one data store, and the process ends.

The capacity of the systems and methods disclosed herein to predict performance metrics based on imaging data and attributes thereof, e.g., spectral properties or holistic scene tags may be established or enhanced using one or more training sets of imaging data, which may be evaluated using a plurality of algorithms. Information regarding the performance and rates of success of the algorithms in processing the imaging data may be determined, and mapped to the spectral properties and/or scene tags, and stored in one or more data stores. Subsequently, the mapped information may be relied upon in making predictions regarding the performance and success of one or more algorithms in processing imaging data, based on spectral properties and/or scene tags of the imaging data, in the future.

Figure 6:
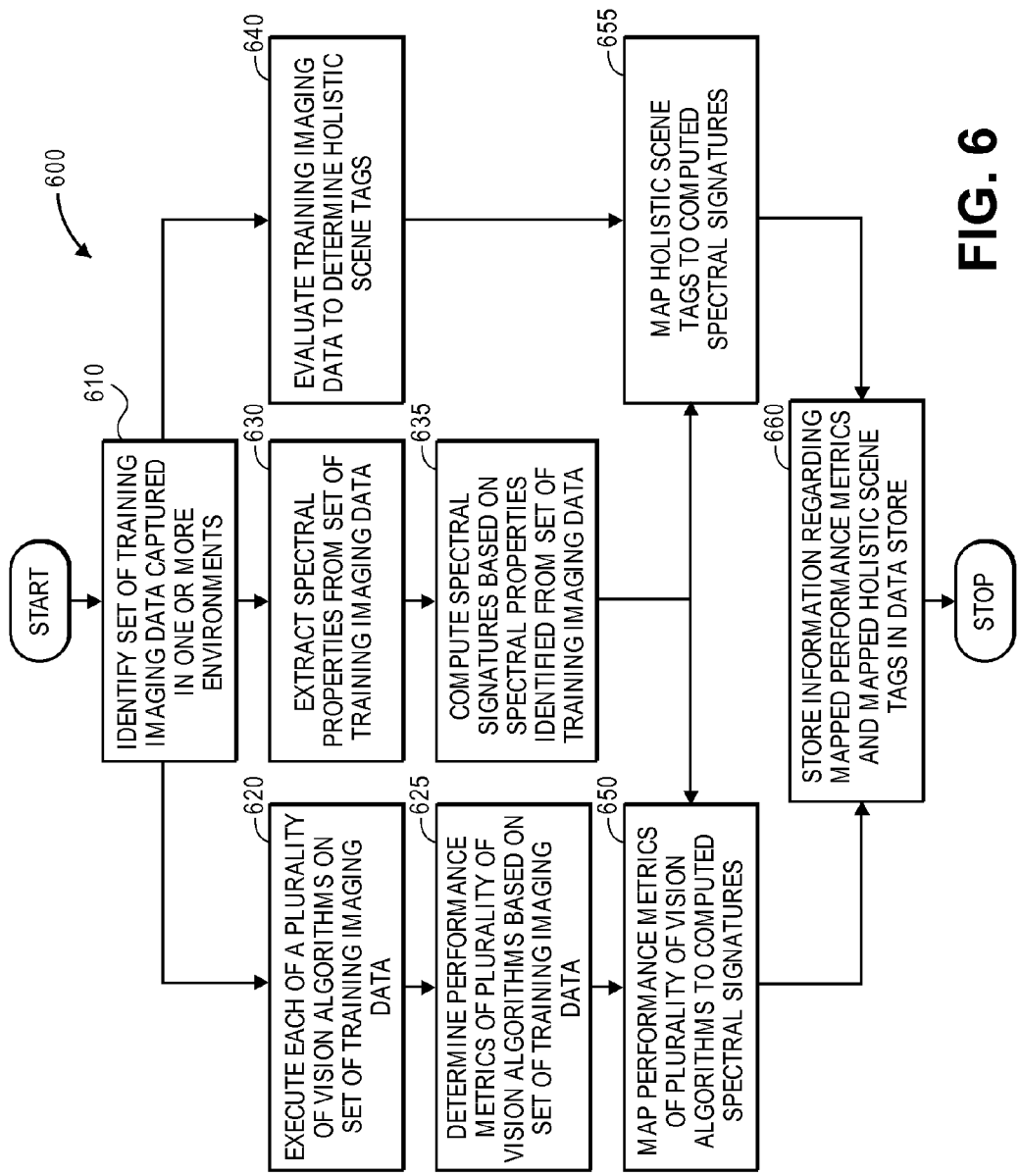
FIG. 6 is a flow chart of one process for training algorithms to predict performance or success in accordance with embodiments of the present disclosure.

Referring to FIG. 6, a flow chart 600 of one process for training algorithms to predict performance or success in accordance with embodiments of the present disclosure is shown. At box 610, a set of training imaging data is captured from one or more environments. For example, as is discussed above and shown in FIG. 2, the environments may be any facilities, stations or locations within which any number of imaging devices may be installed and provided therein, for any purpose. The training imaging data may have been recorded and dedicated for the specific purpose of training At box 630, spectral properties are extracted from the set of imaging data, and at box 635, spectral signatures are computed based on the spectral properties identified from the set of training imaging data. Separately, or in parallel, at box 620, each of a plurality of vision algorithms is executed on the set of training imaging data, and at box 625, performance metrics of the plurality of vision algorithms, e.g., data regarding the operation of one or more computing systems during the execution of the algorithms, are determined. Likewise, at box 640, the training imaging data is evaluated in order to determine one or more holistic scene tags, e.g., whether the imaging data includes still or moving images of an indoor environment or an outdoor environment, or of sunny skies or cloudy skies, or of foliage or green space, or any other qualitative statuses.

Separately, or in parallel, at box 650, the performance metrics of the vision algorithms determined at box 625 are mapped to the spectral signatures computed at box 635, and at box 655, the holistic scene tags determined at box 640 are mapped to the spectral signatures computed at box 635. For example, the performance metrics may include data obtained following the execution of the plurality of vision algorithms, such as the amount of time required to execute each of the algorithms, or the amount of memory, storage space, processing power, network bandwidth or other available features of a computer system that were consumed during the execution, as well as data regarding whether and to what extent the execution of the algorithm was successful, or the levels of accuracy or precision of the outputs of the algorithm. Likewise, the holistic scene tags may include a number of qualitative labels representative of the contents of the imaging data, such as labels or tags classifying features of the background or foreground scenes or other characteristics or properties of the imaging data.

At box 660, information regarding the mapped performance metrics and the mapped holistic scene tags is stored in at least one data store, and the process ends. The information may correlate such metrics with such scene tags in a manner that, in the future, enables performance metrics or rates of success of a given algorithm operating on imaging data to be determined or estimated based on the scene tags of the imaging data, which may be identified by or referenced with one or more qualitative labels or tags. For example, where a set of imaging data is identified as including "high chroma" video imagery or a "dark" still image, algorithms for processing the "high chroma" imagery or the "dark" image may be respectively selected based on the fact that such imaging data is "high chroma" or "dark."

Figure 7:
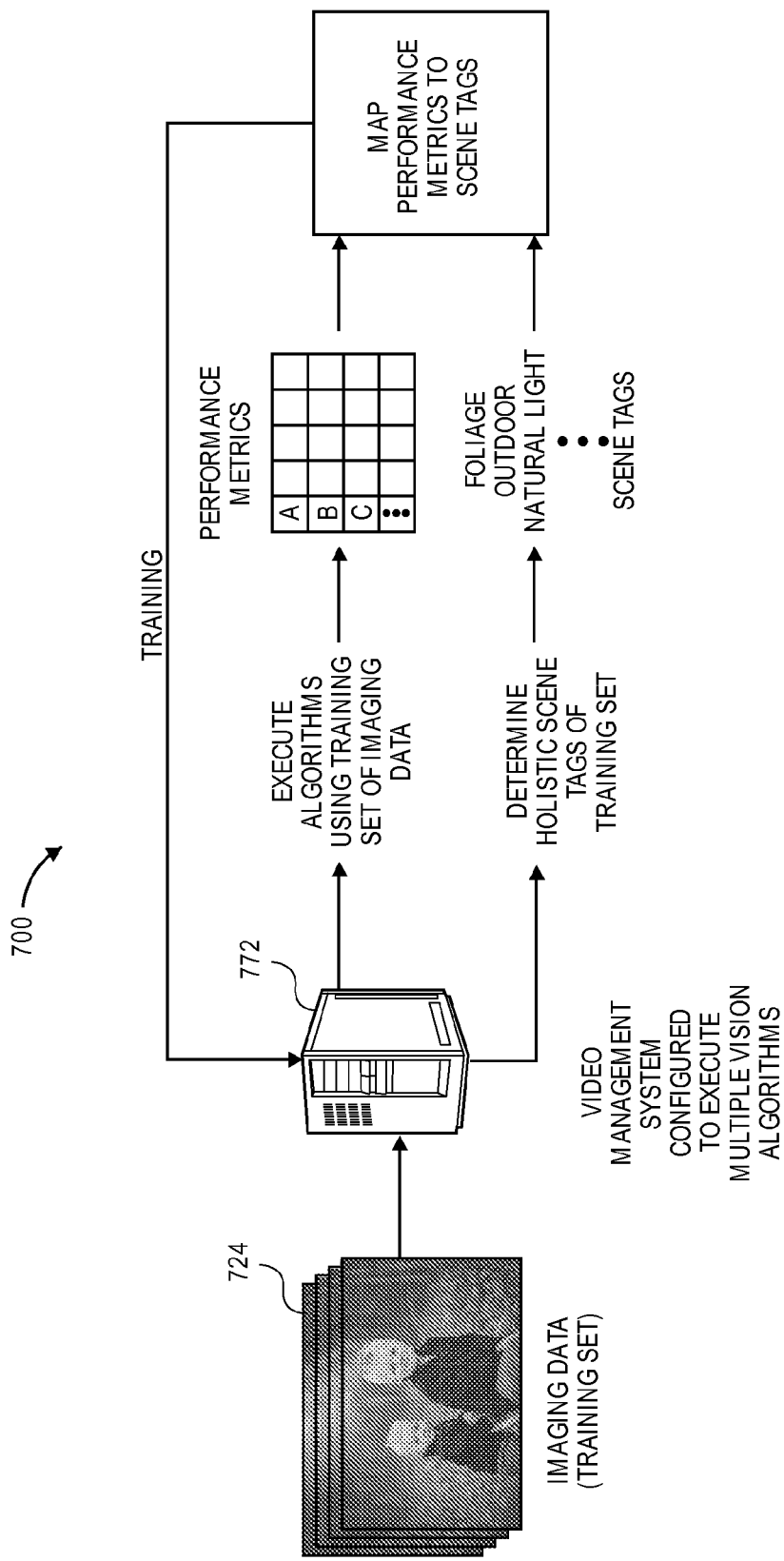
FIG. 7 is a view of aspects of a system for training algorithms to predict performance or success in accordance with embodiments of the present disclosure.

One embodiment of a system that may be trained to determine or predict performance metrics or rates of success of algorithms based on spectral properties and/or scene tags of imaging data is shown in FIG. 7. Referring to FIG. 7, a system 700 for training algorithms to predict performance or success in accordance with embodiments of the present disclosure is shown. Except where otherwise noted, reference numerals preceded by the number "7" shown in the system 700 of FIG. 7 indicate components or features that are similar to components or features having reference numerals preceded by the number "4" shown in the system 400 of FIG. 4, by the number "2" shown in the block diagram 200 of FIG. 2, or by the number "1" shown in the system 100 of FIG. 1.

As is shown in FIG. 7, the system 700 includes a training set of imaging data 724 and a computing device 772 (e.g., a server or other computer component) configured to execute a plurality of vision algorithms. Once the training set of imaging data 724 is provided to the computing device 772, the computing device 772 may execute each of the vision algorithms using the set of imaging data, and also determine one or more holistic scene tags of the training set. Following the execution of the algorithms, a plurality of performance metrics may be determined. The holistic scene tags may include a number of predefined labels (viz., "foliage," "outdoor," "natural light") for the imaging data based on the spectral properties and/or spectral signatures. The performance metrics may be associated with the scene tags, e.g., by mapping the performance metrics to such tags, and the computing device 772 may be trained to predict performance metrics or rates of success with regard to other sets of imaging data having one or more of such tags in the future, using one or more machine learning classifiers, algorithms or techniques (e.g., nearest neighbor or artificial neural networks). For example, a classifier operating on the computing device 772 may be trained using the performance metrics mapped to the scene tags. Subsequently, a scene tag may be provided to the classifiers as an input to the trained classifier, and a performance metric associated with the scene tag may be predicted based at least in part on an output received from the trained classifier, such that one or more algorithms may be selected or identified based on the output.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the processing of imaging data for optical character recognition purposes, the systems and methods disclosed herein are not so limited, and may be used to process any type of information or data obtained or identified in any environment and for any purpose. In some embodiments, the systems and methods disclosed herein may be used to select or identify an optimal algorithm for performing compression, correction, filtering, modeling, noise reduction, quantization, sampling, scaling, segmentation, transformation or zooming operations, or any other processing evolution. In other embodiments, optimal algorithms for the determination of structure from motion, the detection of edges, the combination, conversion, sharpening or smoothing of images, as well as the estimation of poses (e.g., positions or orientations) of imaging devices, the determination of one or more device-specific parameters (e.g., focal lengths, spherical distortions), or the classification, detection, recognition, segmentation or tracking of objects may be identified or selected according to the present disclosure.

Additionally, although some of the embodiments disclosed herein include separate devices for identifying or capturing information or data, and for analyzing or processing the information or data, those of ordinary skill in the pertinent arts will readily recognize that a single device may both capture and process information or data in accordance with the present disclosure.

Furthermore, although some of the embodiments disclosed herein are used to predict the performance or success of an algorithm in processing imaging data based on attributes (e.g., properties or labels) of the imaging data, the systems and methods disclosed herein are not so limited, and may be used to predict the performance or success of any type of algorithm that is provided for processing any type of information or data. For example, those of ordinary skill in the pertinent arts will recognize that a number of algorithms are presently available for conducting voice recognition and translation services on recorded audio files. The systems and methods disclosed herein may be utilized to determine one or more audio properties of such files (e.g., frequencies, intensities, speech rates), and any other relevant metadata or other information (e.g., a location or dialect of a speaker), and predict the performance or success of one or more of the voice recognition and translation algorithms based on such audio properties or other metadata, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An imaging device comprising:
   an imaging sensor;
   at least one memory device; and
   at least one computer processor,
   wherein the at least one computer processor is configured to implement one or more services, and
   wherein the one or more services are configured to:
      capture imaging data using the imaging sensor;
      determine at least one spectral property of the imaging data;
      identify a plurality of algorithms for performing a discrete task using the at least one computer processor;
      predict at least one performance metric of each of the plurality of algorithms for performing the discrete task on the imaging data based at least in part on the at least one spectral property of the imaging data;
      select one of the plurality of algorithms for performing the discrete task on the imaging data based at least in part on the at least one predicted performance metric;
      execute the selected algorithm for performing the discrete task on the imaging data using the at least one computer processor.

2. The imaging device of claim 1, wherein the one or more services are further configured to:
   determine at least one label of at least one scene expressed in the imaging data,
   wherein the at least one performance metric of each of the plurality of algorithms is predicted based at least in part on the at least one label of the at least one scene expressed in the imaging data.

3. The imaging device of claim 1, wherein the at least one performance metric is at least one of:
   an expected amount of memory consumed by each of the plurality of algorithms for performing the discrete task on the imaging data;
   an expected level of accuracy or precision of output of each of the plurality of algorithms for performing the discrete task on the imaging data;
   an expected rate of success of each of the plurality of algorithms for performing the discrete task on the imaging data; or
   an expected time of execution of each of the plurality of algorithms for performing the discrete task on the imaging data.

4. The imaging device of claim 1, wherein the discrete task is at least one of:
   character recognition; determination of structure from motion; edge detection; image-based three-dimensional modeling; image combination; image compression; image conversion; image correction; image filtering; image measurement; image modeling; image noise reduction; image quantization; image sampling; image scaling; image segmentation; image sharpening; image smoothing; image transformation; image zooming; imaging device pose estimation; imaging device-intrinsic parameter determination; object classification; object detection; object recognition; object segmentation; or object tracking.

5. A computer-implemented method comprising:
   identifying imaging data captured using at least one imaging device, wherein the imaging data is stored in at least one data store;
   determining at least one spectral property of the imaging data using at least one computer processor;
   identifying a plurality of algorithms for performing a predetermined task on the imaging data;
   predicting at least one performance metric of at least one of the plurality of algorithms for performing the predetermined task on the imaging data based at least in part on the at least one spectral property using the at least one computer processor; and selecting one of the plurality of algorithms for performing the predetermined task on the imaging data based at least in part on at least one of the at least one spectral property of the imaging data or the at least one predicted performance metric using the at least one computer processor.

6. The computer-implemented method of claim 5, further comprising:
determining at least one resource accessible by the at least one computer processor,
wherein the at least one algorithm for performing the predetermined task on the imaging data is selected based at least in part on the at least one resource.

7. The computer-implemented method of claim 5, further comprising:
executing the at least one algorithm for performing the predetermined task on the imaging data using the at least one computer processor.

8. The computer-implemented method of claim 5, wherein the at least one performance metric is at least one of:
an amount of memory required to execute the at least one of the plurality of algorithms using the at least one computer processor;
a level of accuracy or precision of output of the at least one of the plurality of algorithms;
a rate of success of the at least one of the plurality of algorithms; or
a time required to execute the at least one of the plurality of algorithms using the at least one computer processor.

9. The computer-implemented method of claim 5, further comprising:
identifying at least one background feature expressed in the imaging data; and
determining the at least one spectral property of the imaging data based at least in part on the at least one background feature.

10. The computer-implemented method of claim 5, wherein the at least one spectral property is at least one of:
at least one color expressed in the imaging data;
at least one dimension associated with the imaging data;
at least one representation of at least one horizontal texture or edge component;
at least one representation of at least one vertical texture or edge component;
at least one representation of at least one directional texture or edge component;
an indicator of chromaticity of the imaging data;
an indicator of color saturation of the imaging data;
an indicator of at least one pixel feature in at least one scale or level of resolution;
an indicator of pixel heterogeneity; or
an indicator of pixel homogeneity.

11. The computer-implemented method of claim 5, wherein determining the at least one spectral property of the imaging data further comprises:
providing at least some of the imaging data as an input to at least one filtering algorithm;
processing the at least some of the imaging data according to the at least one filtering algorithm using the at least one computer processor; and
determining the at least one spectral property of the imaging data based at least in part on an output of the at least one filtering algorithm using the at least one computer processor.

12. The computer-implemented method of claim 11, wherein the at least one filtering algorithm is one of a fast Fourier transform or a discrete Fourier transform.

13. The computer-implemented method of claim 5, further comprising:
determining at least one scene tag associated with the imaging data based at least in part on the at least one spectral property of the imaging data using the at least one computer processor; and
selecting the one of the plurality of algorithms for performing the predetermined task on the imaging data based at least in part on the at least one scene tag.

14. The computer-implemented method of claim 13, wherein selecting the at least one algorithm for performing the predetermined task on the imaging data based at least in part on the at least one scene tag further comprises:
providing the at least one scene tag to a classifier as an input; and
selecting the at least one algorithm for performing the predetermined task on the imaging data based at least in part on an output of the classifier.

15. The computer-implemented method of claim 5, further comprising:
identifying metadata associated with the imaging data using the at least one computer processor; and
selecting the one of the plurality of algorithms for performing the predetermined task on the imaging data based at least in part on the metadata associated with the imaging data using the at least one computer processor,
wherein the metadata comprises at least one of:
a date on which the imaging data was captured using the at least one imaging device;
a time on which the imaging data was captured using the at least one imaging device;
at least one location associated with the imaging data; or
at least one environmental characteristic associated with the imaging data;
at least one lighting condition associated with the imaging data;
a type of the at least one imaging device; or
a type of at least one imaging sensor provided in the at least one imaging device.

16. The computer-implemented method of claim 5, wherein the predetermined task is at least one of:
character recognition; determination of structure from motion; edge detection; image-based three-dimensional modeling; image combination; image compression; image conversion; image correction; image filtering; image measurement; image modeling; image noise reduction; image quantization; image sampling; image scaling; image segmentation; image sharpening; image smoothing; image transformation; image zooming; imaging device pose estimation; imaging device-intrinsic parameter determination; object classification; object detection; object recognition; object segmentation; or object tracking.

17. The computer-implemented method of claim 5, wherein the at least one imaging device comprises the at least one computer processor.

18. A non-transitory computer-readable medium having computer-executable instructions stored thereon,
wherein the instructions, when executed, cause a computing device having at least one computer processor and at least one data store to perform a method comprising:

identifying a first set of imaging data captured from a first environment using at least one imaging device;

identifying at least one first spectral property of the first set of imaging data using the at least one computer processor;

executing each of a plurality of algorithms for performing a predetermined task on the first set of imaging data using the at least one computer processor;

determining at least one first performance metric for each of the plurality of algorithms using the at least one computer processor;

determining at least one first scene tag expressed in the first set of imaging data based at least in part on the at least one first spectral property of the first set of imaging data using the at least one computer processor;

correlating the at least one first performance metric to the at least one first scene tag expressed in the first set of imaging data using the at least one computer processor; and storing information regarding the correlated at least one first performance metric for each of the plurality of algorithms and the at least one first scene tag expressed in the first set of imaging data in at least one data store.

19. The non-transitory computer-readable medium of claim 18, wherein the method further comprises:

identifying a second set of imaging data captured from a second environment using the at least one imaging device;

determining at least one second scene tag expressed in the second set of imaging data using the at least one computer processor;

predicting at least one second performance metric for each of the plurality of algorithms based at least in part on the information regarding the correlated at least one first performance metric for each of the plurality of algorithms and the at least one second scene tag expressed in the second set of imaging data; and selecting one of the plurality of algorithms for performing the predetermined task on the second set of imaging data using the at least one computer processor based at least in part on the at least one predicted second performance metric.

20. The non-transitory computer-readable medium of claim 19, wherein predicting the at least one second performance metric for each of the plurality of algorithms further comprises:

training at least one classifier using the information regarding the correlated at least one first performance metric for each of the plurality of algorithms and the at least one first scene tag expressed in the first set of imaging data using the at least one computer processor;

providing the at least one second scene tag to the trained at least one classifier as an input;

identifying an output from the at least one classifier; and predicting the at least one second performance metric for each of the plurality of algorithms based at least in part on the output from the at least one classifier.

21. The non-transitory computer-readable medium of claim 18, wherein correlating the at least one first performance metric to the at least one first scene tag expressed in the first set of imaging data further comprises:

mapping the at least one first performance metric for each of the plurality of algorithms to the at least one first spectral property of the first set of imaging data using the at least one computer processor; and mapping the at least one first scene tag to the at least one first spectral property of the first set of imaging data using the at least one computer processor.

* * * * *